(12) United States Patent
Hirashima et al.

(10) Patent No.: US 10,549,765 B2
(45) Date of Patent: Feb. 4, 2020

(54) RAILCAR

(71) Applicant: KAWASAKI JUKOGYO KABUSHIKI KAISHA, Hyogo (JP)

(72) Inventors: Toshiyuki Hirashima, Kobe (JP); Shirou Honma, Kobe (JP); Hitoshi Nagahara, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 220 days.

(21) Appl. No.: 15/552,374

(22) PCT Filed: Feb. 27, 2015

(86) PCT No.: PCT/JP2015/001048
§ 371 (c)(1),
(2) Date: Aug. 21, 2017

(87) PCT Pub. No.: WO2016/135781
PCT Pub. Date: Sep. 1, 2016

(65) Prior Publication Data
US 2018/0037238 A1  Feb. 8, 2018

(51) Int. Cl.
*B61F 1/14* (2006.01)
*B61D 17/10* (2006.01)
*B61F 1/12* (2006.01)

(52) U.S. Cl.
CPC .............. *B61F 1/14* (2013.01); *B61D 17/10* (2013.01); *B61F 1/12* (2013.01); *B60L 2200/26* (2013.01)

(58) Field of Classification Search
CPC ....... B60L 2200/26; B61D 17/10; B61F 1/08; B61F 1/12; B61F 1/14; B62D 25/2054; B62D 33/02; B62D 65/02; B62D 29/008; B21D 11/206; B21D 53/04
See application file for complete search history.

(56) References Cited

U.S. PATENT DOCUMENTS 4,074,495 A * 2/1978 Bodnar .................. B21D 13/08
428/603

FOREIGN PATENT DOCUMENTS

| CN | 201309700 Y | 9/2009 |
|---|---|---|
| JP | H05-254429 A | 10/1993 |
| JP | H06-45884 U | 6/1994 |
| JP | 2012-101639 A | 5/2012 |
| WO | 2013/150736 A1 | 10/2013 |

OTHER PUBLICATIONS

International Search Report issued in PCT/JP2015/001048; dated May 26, 2015.
An Office Action mailed by the State Intellectual Property Office of the People's Republic of China dated Jul. 3, 2018, which corresponds to Chinese Patent Application No. 201580076666.8 and is related to U.S. Appl. No. 15/552,374.

* cited by examiner

*Primary Examiner* — Mark T Le
(74) *Attorney, Agent, or Firm* — Studebaker & Brackett PC

(57) ABSTRACT

A railcar includes: an underframe including a pair of side sills and a plurality of cross beams each connected to the pair of side sills, the cross beams being arranged at intervals in a car longitudinal direction; and a floor pan arranged in a space surrounded by the pair of side sills and a pair of adjacent cross beams among the plurality of cross beams, the floor pan being fixed to the underframe, the floor pan being configured as a strength member configured to bear at least one of a compressive load and shearing load applied from the underframe.

12 Claims, 8 Drawing Sheets

RAILCAR

TECHNICAL FIELD

The present invention relates to a railcar and particularly to a railcar including a floor structure having a floor pan.

BACKGROUND ART

A railcar bodyshell includes: an underframe; a pair of side bodyshells provided at both respective car width direction sides of the underframe; a roof bodyshell provided over the side bodyshells; and end bodyshells provided at both respective car longitudinal direction ends of the underframe. The underframe includes: a pair of side sills extending in a car longitudinal direction; and a plurality of cross beams extending in a car width direction and connected to the pair of side sills. A floor pan (also referred to as a "sub-floor pan") is provided in a space surrounded by the pair of side sills and a pair of adjacent cross beams, and a floor panel is provided above the floor pan. For example, as disclosed in PTL 1, a heat insulating material is provided between the floor pan and the floor panel.

CITATION LIST

Patent Literature

PTL 1: Japanese Laid-Open Patent Application Publication No. 2012-101639

SUMMARY OF INVENTION

Technical Problem

The railcar bodyshell is required to have structural strength that can bear, for example, a compressive load applied to a car end in the car longitudinal direction and a torsional load applied during traveling, during jack-up for maintenance, or during lift-up by a crane. Therefore, in some cases, the strength of the bodyshell is increased by increasing thicknesses of the side sills and the cross beams and/or increasing the number of members reinforcing the underframe. However, in such cases, the weight of the railcar may increase.

An object of the present invention is to increase structural strength of a railcar bodyshell by a simple configuration while suppressing an increase in weight of the railcar bodyshell.

Solution to Problem

To solve the above problems, a railcar according to one aspect of the present invention includes: an underframe including a pair of side sills and a plurality of cross beams each connected to the pair of side sills, the cross beams being arranged at intervals in a car longitudinal direction; and a floor pan arranged in a space surrounded by the pair of side sills and a pair of adjacent cross beams among the plurality of cross beams, the floor pan being fixed to the underframe, the floor pan being configured as a strength member configured to bear at least one of a compressive load and shearing load applied from the underframe.

According to the above configuration, the floor pan is arranged in the space surrounded by the pair of side sills and a pair of adjacent cross beams among the plurality of cross beams and is fixed to the underframe, and the floor pan is configured as the strength member configured to bear at least one of the compressive load and shearing load applied from the underframe. By using the floor pan as the strength member as above, the railcar bodyshell can be reinforced by a simple configuration, and the structural strength of the railcar bodyshell can be improved. Further, for the purpose of increasing the strength of the railcar bodyshell, it is unnecessary to increase the thicknesses of the side sills and the cross beams and also unnecessary to increase the number of reinforcing members reinforcing the underframe. Thus, the increase in weight of the railcar due to the reinforcement of the railcar can be suppressed.

Advantageous Effects of Invention

The above aspect of the present invention can increase structural strength of a railcar bodyshell by a simple configuration while suppressing an increase in weight of the railcar bodyshell.

DESCRIPTION OF EMBODIMENTS

Figure 1:
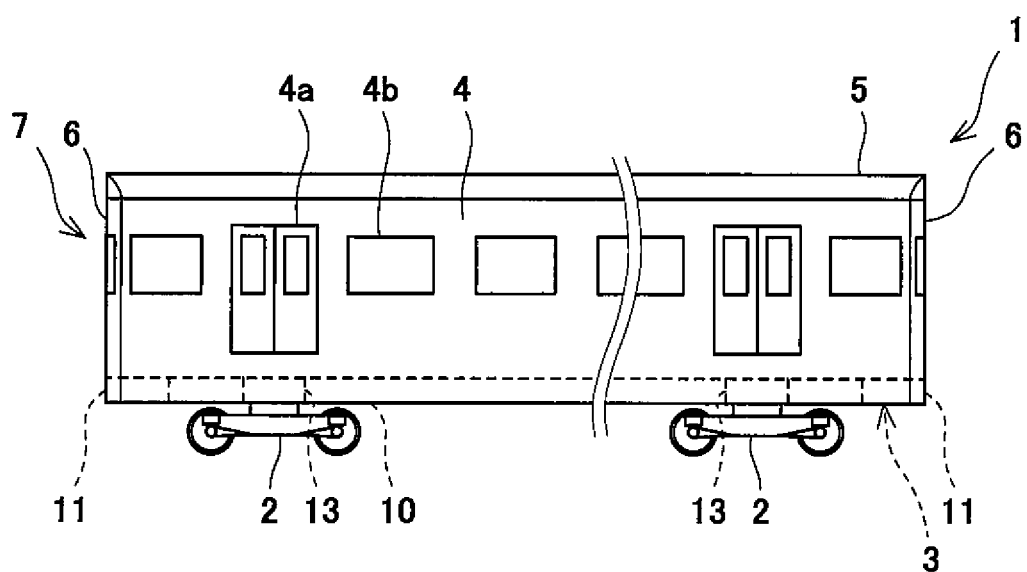
FIG. 1 is a schematic side view of a railcar according to an embodiment.
Figure 2:
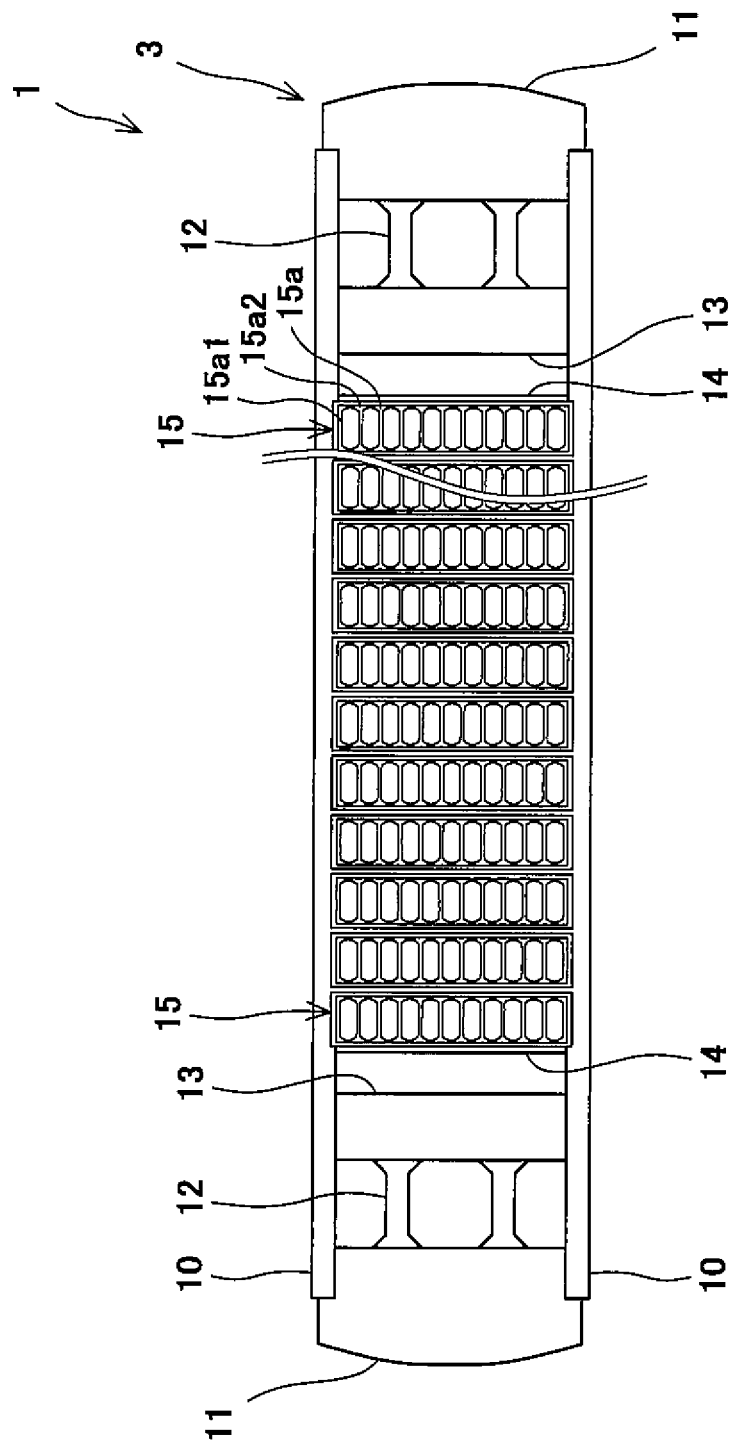
FIG. 2 is a plan view of an underframe when viewed from above in a vertical direction.
Figure 3:
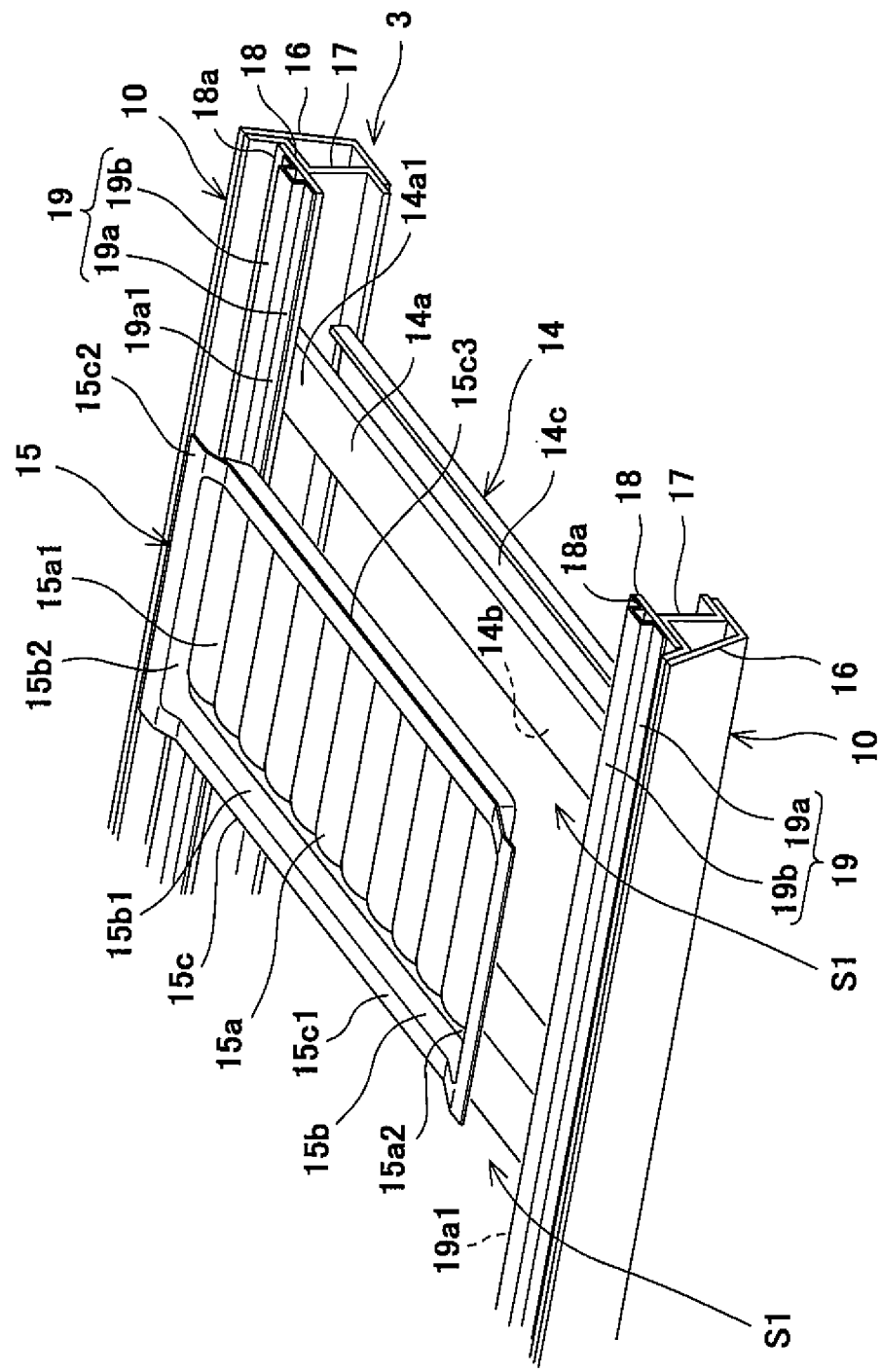
FIG. 3 is an exploded perspective view showing a part of the underframe and a floor pan.
Figure 4:
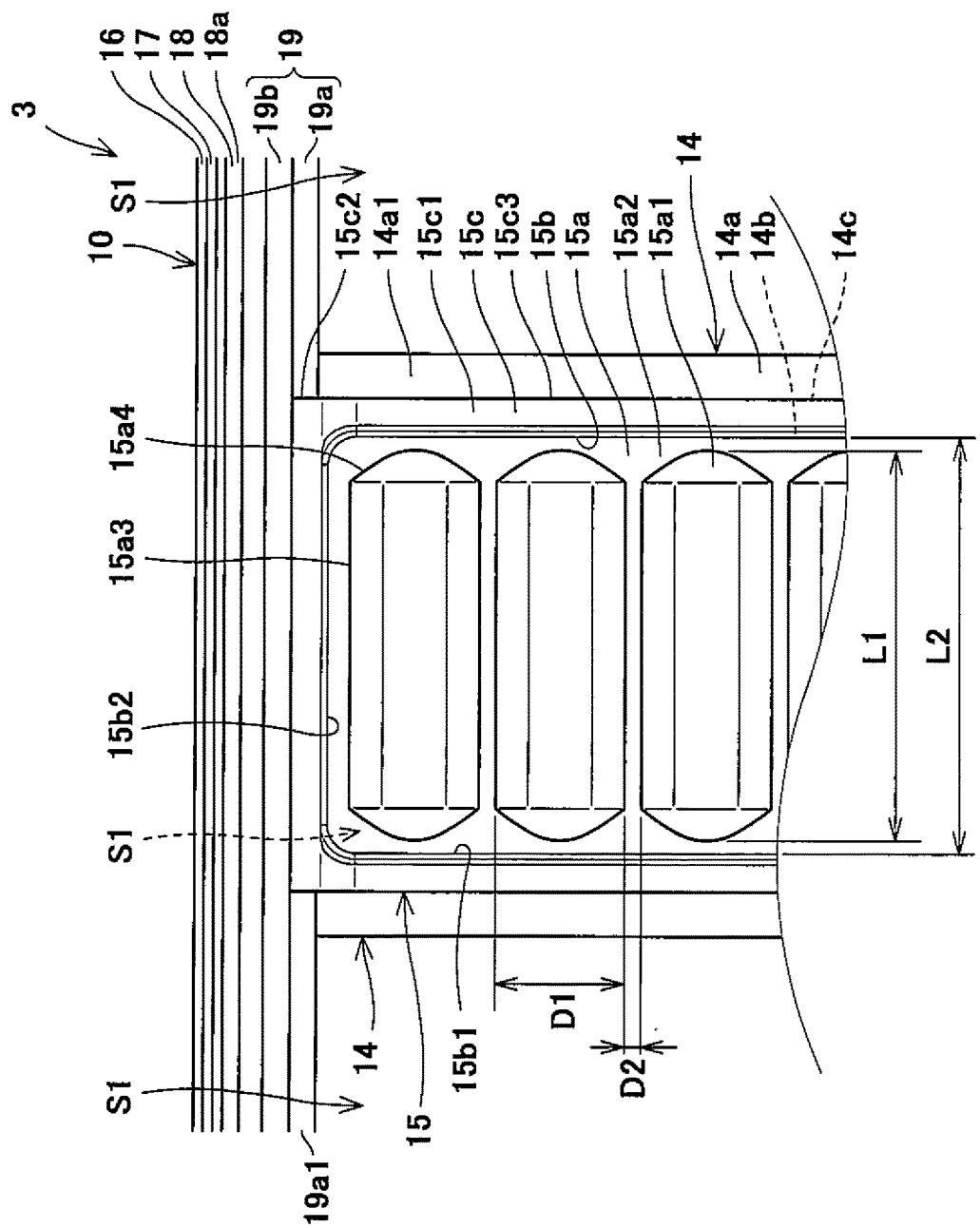
FIG. 4 is a plan view showing a part of the underframe and the floor pan when viewed from above in the vertical direction.
Figure 5:
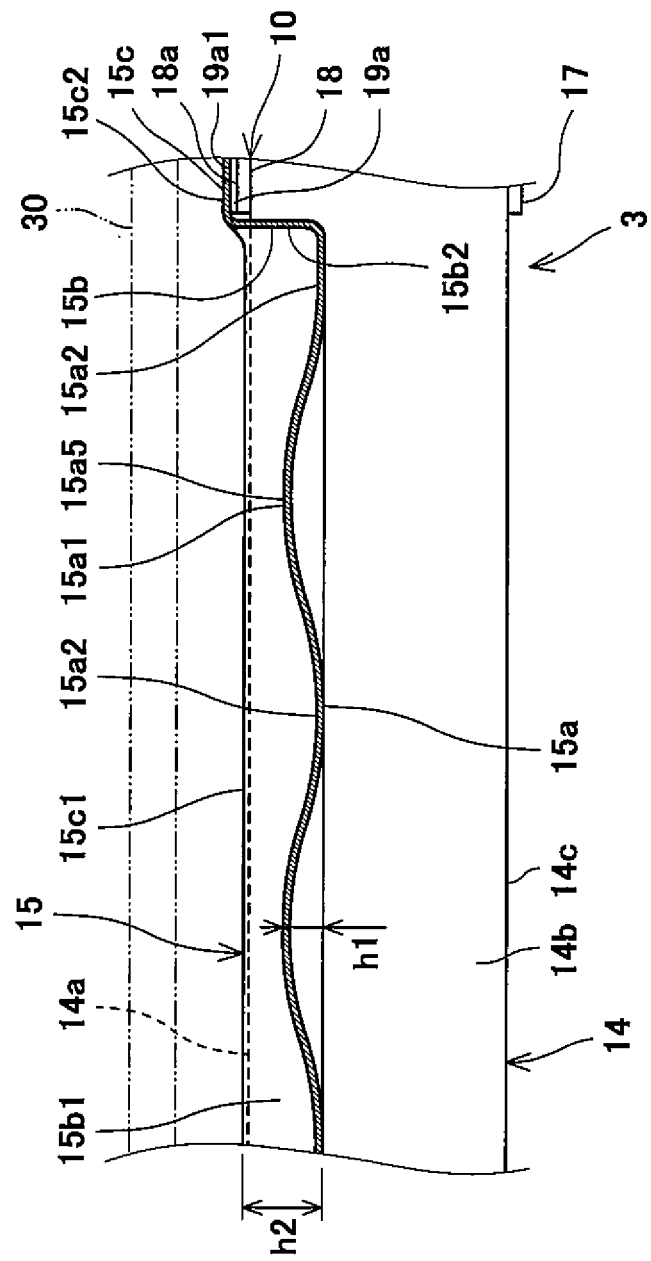
FIG. 5 is a partially sectional view of the floor pan when viewed from a car longitudinal direction.
Figure 6:
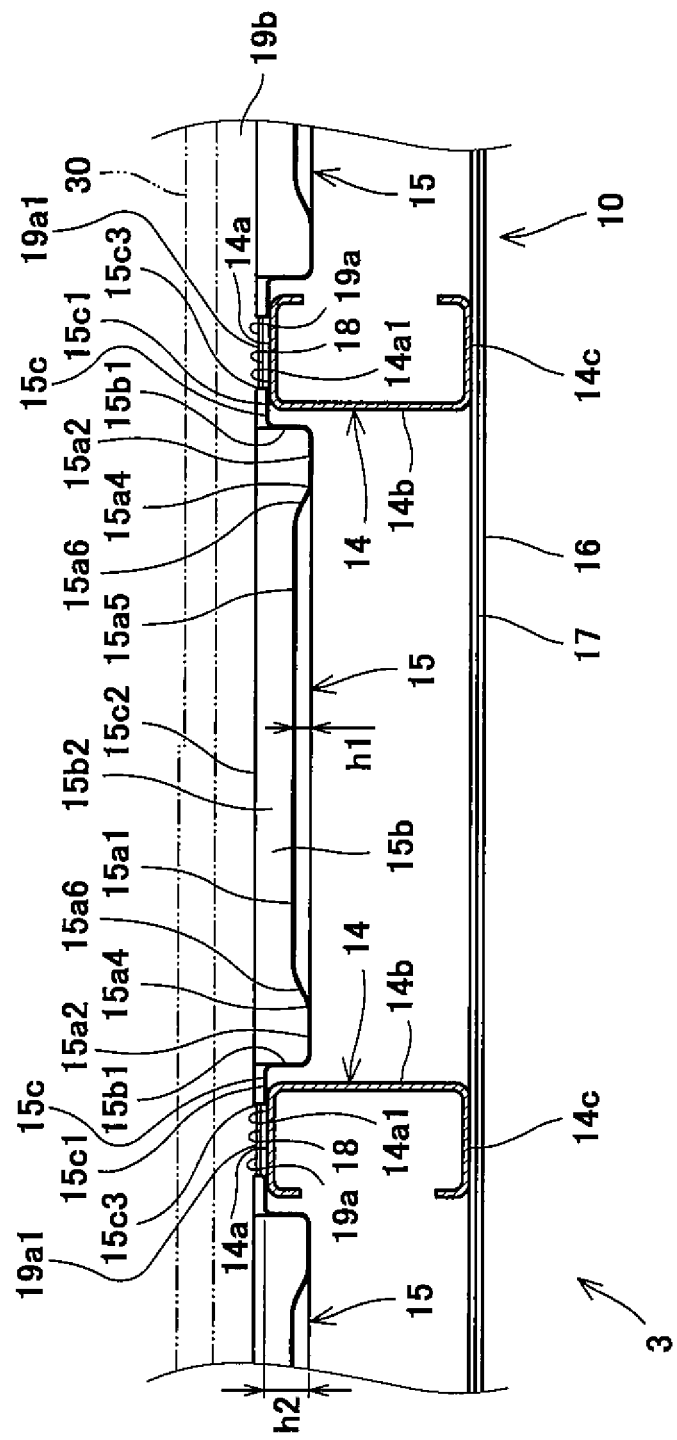
FIG. 6 is a partially sectional view of the floor pan when viewed from a car width direction.

Hereinafter, an embodiment of the present invention will be explained in reference to the drawings. FIG. 1 is a schematic side view of a railcar 1 according to the embodiment. FIG. 2 is a plan view of an underframe 3 when viewed from above in a vertical direction. FIG. 3 is an exploded perspective view showing a part of the underframe 3 and a floor pan 15. FIG. 4 is a plan view showing a part of the underframe 3 and the floor pan 15 when viewed from above in the vertical direction. For convenience sake, only one floor pan 15 is shown in each of FIGS. 3 and 4. FIG. 5 is a partially sectional view of the floor pan 15 when viewed from a car longitudinal direction. FIG. 6 is a partially sectional view of the floor pan 15 when viewed from a car width direction.

As shown in FIG. 1, the railcar 1 includes a pair of bogies 2 and a carbody (railcar bodyshell) 7 supported by the bogies 2. The carbody 7 includes the underframe 3, side bodyshells 4, a roof bodyshell 5, and end bodyshells 6. The bogies 2 are arranged at respective positions separated from each other in the car longitudinal direction. The side bodyshells 4 are arranged at both respective car width direction sides of the underframe 3, and door openings 4a and window openings 4b are formed on outside plates of the side bodyshells 4. The roof bodyshell 5 is arranged above the side bodyshells 4 and coupled to the side bodyshells 4. The end bodyshells 6 are arranged at both respective car longitudinal direction sides of the underframe 3.

As shown in FIGS. 2 and 3, the underframe 3 includes side sills 10, end beams 11, center sills 12, bolster beams 13, cross beams 14, and the floor pans 15. The side sills 10 form a pair, extend in the car longitudinal direction, and are arranged so as to be spaced apart from each other in the car width direction. Each of the side sills 10 includes: a first plate member 16 having a substantially L-shaped section when viewed from the car longitudinal direction; a second plate member 17 combined with the first plate member 16 and having a substantially W-shaped section when viewed from the car longitudinal direction; and a third plate member 18 connected to the second plate member 17 and including an upper surface 18*a* projecting in a horizontal direction, that is, projecting inward in the car width direction of the underframe 3. The first plate member 16, the second plate member 17, and the third plate member 18 extend in the car longitudinal direction. The second plate member 17 is combined with the first plate member 16 such that an internal space is formed between the first plate member 16 and the second plate member 17. Thus, a hollow structure is formed in the side sill 10. A supporting member 19 is provided on the upper surface 18*a* of the third plate member 18. The supporting member 19 reinforces the side sill 10 and supports a below-described floor panel 30. The supporting member 19 extends in the car longitudinal direction and has a hat-shaped section when viewed from the car longitudinal direction. The supporting member 19 includes: a main body portion 19*b* including a flat upper surface and having a contour shape that is convex upward when viewed from the car longitudinal direction; and a pair of flange portions 19*a* projecting from respective lower ends of the main body portion 19*b* in respective directions opposite to each other and fixed to the upper surface 18*a* of the third plate member 18. The floor panel 30 is arranged above the supporting member 19. The flat upper surface of the main body portion 19*b* of the supporting member 19 supports the floor panel 30 (see FIGS. 5 and 6) from below.

As shown in FIG. 2, the end beams 11 extend in the car width direction and are connected to car longitudinal direction end portions of the side sills 10. The bolster beams 13 forms a pair and extend in the car width direction. The bolster beams 13 are arranged at an inner side of the end beams 11 in the car longitudinal direction of the railcar 1 and connected to the side sills 10. The bogies 2 are coupled to respective lower portions of the bolster beams 13. With this, a load from the carbody 7 is transmitted to the bogies 2. The center sills 12 extend in the car longitudinal direction. Each of the center sills 12 is arranged between the end beam 11 and the bolster beam 13 and connected to the end beam 11 and the bolster beam 13.

The cross beams 14 are members extending in the car width direction and connecting the side sills 10 to each other and are arranged between the bolster beams 13 adjacent to each other in the car longitudinal direction. As one example, each of the cross beams 14 has a C-shaped section when viewed from the car width direction (see FIG. 6). The cross beam 14 includes: an upper plate portion 14*a* extending in the horizontal direction; a lower plate portion 14*c* extending in the horizontal direction and located under and spaced apart from the upper plate portion 14*a*; a side plate portion 14*b* connected to one car longitudinal direction end of the upper plate portion 14*a* and one car longitudinal direction end of the lower plate portion 14*c*. In the railcar 1, a large number of cross beams 14 are arranged at intervals in the car longitudinal direction. With this, a plurality of spaces S1 each surrounded by a pair of side sills 10 and a pair of adjacent cross beams 14 are lined up in the car longitudinal direction.

Each of the floor pans 15 extends in the car width direction, is arranged in the space S1, and is fixed to a pair of side sills 10 and a pair of cross beams 14. As one example, among the plurality of spaces S1, the floor pans 15 are arranged in the spaces S1 spaced apart from each of the bolster beams 13 inward in the car longitudinal direction by one or more spaces S1. To be specific, the floor pan 15 is not arranged in the space S1 that is nearest to each of the bolster beams 13. With this, a plurality of floor pans 15 are arranged in the respective spaces S1 in the car longitudinal direction around a middle portion of the railcar 1.

The floor pan 15 has a bathtub shape including a bottom wall portion 15*a*, side wall portions 15*b*, and a flange portion 15*c*. The bottom wall portion 15*a* is located lower than an upper surface 14*a*1 of the upper plate portion 14*a* of the cross beam 14 and the upper surface 18*a* of the third plate member 18 of the side sill 10. The bottom wall portion 15*a* has a rectangular contour in plan view and includes long sides extending in the car width direction and short sides extending in the car longitudinal direction. Further, the bottom wall portion 15*a* includes: a plurality of mountain portions 15*a*1 arranged at intervals; and a continuous flat portion 15*a*2 surrounding the mountain portions 15*a*1. The mountain portions 15*a*1 are swelling portions swelling in the vertical direction (herein, upward in the vertical direction).

As shown in FIG. 4, each of the mountain portions 15*a*1 includes: a base portion 15*a*3 extending in the car longitudinal direction; and end portions 15*a*4 formed at both respective longitudinal direction ends of the base portion 15*a*3. In the bottom wall portion 15*a*, the mountain portions 15*a*1 are arranged at intervals and lined up in the car width direction. When viewed from the vertical direction, a contour shape of the end portion 15*a*4 is a curved shape that is convex outward in the car longitudinal direction (car forward/rearward direction), and specifically, is a circular-arc shape. As shown in FIG. 5, when viewed from the car longitudinal direction, the contour shape of the mountain portion 15*a*1 is a curved shape that is convex upward, and specifically, is a circular-arc shape. The mountain portions 15*a*1 are formed in a gentle corrugated shape such that the flat portion 15*a*2 is located among the mountain portions 15*a*1. As shown in FIG. 6, when viewed from the car width direction, the contour shape of the mountain portions 15*a*1 is constituted by a linear portion 15*a*5 and a pair of curved portions 15*a*6. The linear portion 15*a*5 is spaced apart from the flat portion 15*a*2 and extends in the car longitudinal direction. Each of the curved portions 15*a*6 is curvedly connected to a corresponding one of both car longitudinal direction end portions of the linear portion 15*a*5 and the flat portion 15*a*2. When viewed from the car width direction, the curved portion 15*a*6 has a curved shape that is convex upward, and specifically, has a circular-arc shape. As above, when viewed from the car longitudinal direction and the car width direction, the mountain portion 15*a*1 does not have any corner portions. Further, when viewed from above in the vertical direction, the base portion 15*a*3 and end portion 15*a*4 of the mountain portion 15*a*1 are connected to each other at a gentle angle. Therefore, local stress concentration on the mountain portions 15*a*1 is avoided.

A swelling height h1 of the mountain portion 15*a*1 in the vertical direction is set to be a height lower than the side wall portions 15*b*. As four side wall portions 15*b* surrounding the bottom wall portion 15*a*, side wall portions 15*b*1 located close to the cross beams 14 are lower than side wall portions 15b2 located close to the side sills 10. As one example, the swelling height h1 of the mountain portion 15a1 is set to a value that is not less than 10% and not more than 50% of a height h2 of the side wall portion 15b1 located close to the cross beam 14. By setting the swelling height h1 as above, a wide interval between the floor panel 30 and the linear portion 15a5 of the mountain portions 15a1 in the vertical direction is secured to some extent. Thus, heat transfer from the mountain portions 15a1 to the floor panel 30 is suppressed.

As one example, a width D1 of the mountain portion 15a1 in the car width direction is set to be larger than an interval D2 between the mountain portions 15a1 in the car width direction. More specifically, the width D1 is set to a value that is not less than three times and not more than 15 times the interval D2. By setting the width D1 as above, buckling of the flat portion 15a2 by application of a load can be prevented. Further, a length L1 of the mountain portion 15a1 in the car longitudinal direction is shorter than a length L2 of the bottom wall portion 15a in the car longitudinal direction. As one example, the length L1 is set to a value that is not less than 70% and not more than 95% of the length L2. By setting the length L1 as above, an interval between the mountain portion 15a1 and the side wall portion 15b is secured. Thus, as described below, the floor pan 15 can be easily produced by press working.

The flat portion 15a2 is formed so as to surround the mountain portions 15a1. In other words, the mountain portions 15a1 adjacent to each other in the car width direction are separated from each other by the flat portion 15a2, and all the mountain portions 15a1 are separated from the side wall portions 15b by the flat portion 15a2. When the bottom wall portion 15a is viewed from the vertical direction, as one example, an apparent total area of the mountain portions 15a1 is set to be larger than an apparent total area of the flat portion 15a2. The "apparent area" herein denotes a projected area when the bottom wall portion 15a is viewed from the vertical direction in plan view.

The side wall portions 15b surround a peripheral edge of the bottom wall portion 15a and extend upward from the peripheral edge of the bottom wall portion 15a. The flange portion 15c is connected to upper ends of the side wall portions 15b. The flange portion 15c includes: long side portions 15c1 extending in the car width direction; and short side portions 15c2 extending in the car longitudinal direction. Each of the long side portions 15c1 is fixed to the upper surface 14a1 of the upper plate portion 14a of the cross beam 14. Each of the short side portions 15c2 is fixed to an upper surface 19a1 of the flange portion 19a of the supporting member 19. With this, the short side portion 15c2 is arranged at a position higher than the long side portion 15c1.

The floor pan 15 is integrally formed by subjecting a metal (stainless steel, for example) plate member to press working. A thickness of the floor pan 15 is smaller than any of thicknesses of the first plate member 16, second plate member 17, and third plate member 18 of the side sill 10 and also smaller than a thickness of the cross beam 14. From the viewpoint of processability of the floor pan 15, securement of the structural strength of the floor pan 15, and suppression of the increase in weight of the floor pan 15, the thickness of the floor pan 15 is desirably not less than 0.6 mm and not more than 1.2 mm, more desirably not less than 0.9 mm and not more than 1.0 mm.

On the upper surface 14a1 of the upper plate portion 14a of the cross beam 14, an end portion 15c3 of the long side portion 15c1 of the floor pan 15 is spaced apart from and opposes another end portion 15c3 of the long side portion 15c1 of the adjacent floor pan 15 (see FIG. 6). The long side portion 15c1 of the flange portion 15c is fixed to the upper plate portion 14a of the cross beam 14 by spot welding. The short side portion 15c2 of the flange portion 15c is fixed to the flange portion 19a of the supporting member 19 by spot welding.

Heat insulating materials (not shown) are arranged between the floor pan 15 and the floor panel 30 and around the supporting member 19. A plurality of underfloor devices (for example, high voltage devices, such as a main transformer and a main converter), not shown, fixed to the carbody 7 are arranged under the floor pans 15.

As explained above, the mountain portions 15a1 extending in the car longitudinal direction and lined up in the car width direction and the flat portion 15a2 surrounding the mountain portions 15a1 are formed on the bottom wall portion 15a of the floor pan 15. Therefore, even when external force is applied to the floor pan 15 in any of the vertical direction, the car longitudinal direction, and the car width direction, the floor pan 15 hardly deforms. With this, the floor pan 15 serves as a strength member configured to bear a compressive load and shearing load applied from the pair of side sills 10 or the cross beams 14. To be specific, a frame structure of the underframe 3 including the pair of side sills 10 and the plurality of cross beams 14 in the carbody 7 is reinforced by the plurality of floor pans 15. With this, the carbody 7 can be reinforced by a simple configuration, and the structural strength of the carbody 7 can be increased. Further, the floor pans 15 strongly couple the pair of side sills 10 to each other. Therefore, it is possible to increase the strength with respect to lateral buckling of the underframe 3 and buckling of each side sill 10 by the compressive load applied to a car end. On this account, for the purpose of increasing the strength of the underframe 3, it is unnecessary to increase the thicknesses of the side sills 10 and the cross beams 14 and also unnecessary to increase the number of reinforcing members reinforcing the underframe 3. Thus, the increase in weight of the carbody 7 can be suppressed.

Specifically, even when the compressive load in the car longitudinal direction is applied to the car end of the carbody 7, the deformation of the floor pans 15 is prevented by the mountain portions 15a1 extending in the car longitudinal direction against the compressive load. Thus, the carbody 7 is reinforced so as to be able to bear the compressive load. Further, even when a torsional load is applied to the carbody 7 during traveling, during jack-up for maintenance, during lift-up by a crane, or the like, and as a result, the shearing load is applied to the underframe 3, the deformation of the floor pans 15 is prevented by the mountain portions 15a1 and the flat portion 15a2 against the shearing load. Thus, the carbody 7 is reinforced so as to be able to bear the torsional load.

The contour shape of the mountain portions 15a1 when viewed from the car longitudinal direction is the curved shape. Therefore, even when a load is applied to the carbody 7 in the car width direction, local stress concentration on the mountain portions 15a1 is prevented. Further, when viewed from the car width direction, the linear portion 15a5 of the mountain portion 15a1 and the pair of curved portions 15a6 of the mountain portion 15a1 are curvedly connected to one another. Therefore, even when a load is applied to the carbody 7 in the car longitudinal direction, local stress concentration on each portion where the linear portion 15a5 of the mountain portion 15a1 and the curved portion 15a6 of the mountain portion 15a1 are connected to each other is prevented. Further, when viewed from the vertical direction, the base portion 15a3 of the mountain portion 15a1 and the pair of the end portion 15a4 of the mountain portion 15a1 are connected to one another at a gentle angle. Therefore, even when a load is applied to the carbody 7 in any of the car longitudinal direction and the car width direction, local stress concentration on each portion where the base portion 15a3 of the mountain portion 15a1 and the end portion 15a4 of the mountain portion 15a1 are connected to each other is prevented. As above, damages and deformation of the floor pans 15 by the local stress concentration can be appropriately prevented.

Further, the mountain portions 15a1 and the flat portion 15a2 are formed on the bottom wall portion 15a of the floor pan, and the bottom wall portion 15a is located lower than the upper surface 14a1 of the upper plate portion 14a of the cross beam 14 and the upper surface 18a of the third plate member 18 of the side sill 10. Therefore, even when a load is applied to the flange portion 15c from outside, the load is hardly transmitted to the bottom wall portion 15a. On this account, the damages of the floor pan 15 can be appropriately prevented.

Further, when the bottom wall portion 15a is viewed from the vertical direction, the apparent total area of the mountain portions 15a1 is set to be larger than the apparent total area of the flat portion 15a2. Therefore, buckling strength of the flat portion 15a2 can be increased, and the function of the floor pan 15 as the strength member can be improved without increasing the thickness of the floor pan 15.

Further, in the railcar 1, the floor pans 15 are arranged in the spaces S1 spaced apart from each of the bolster beams 13 inward in the car longitudinal direction by one or more spaces S1. Main purposes for this are to: prevent an excessive compressive load from being directly applied to the floor pan 15 from the bolster beam 13; and secure a space above the bogie 2 (i.e., prevent the bogie 2 and the floor pan 15 from interfering with each other). As a result, while reducing the number of floor pans 15 and suppressing the increase in weight, the car longitudinal direction middle portion of the carbody 7 can be intensively reinforced, and therefore, the structural strength of the railcar bodyshell can be effectively improved.

Further, since the strength of the underframe 3 is improved, the height of the cross beam 14 can be reduced. Therefore, for example, by lowering the position of the upper surface 14a1 of the cross beam 14 while maintaining the position of the floor panel 30 in the vertical direction, a wide space between the cross beam 14 and the floor panel 30 can be secured, and therefore, heat insulation performance can be improved.

Figure 7:
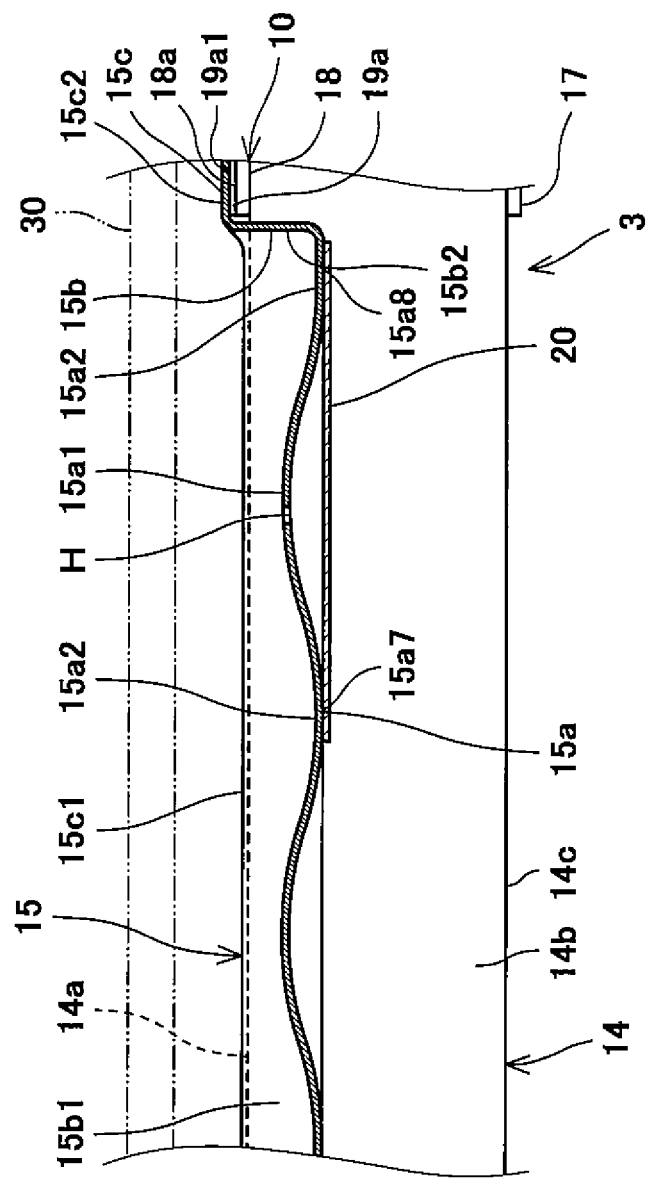
FIG. 7 is a partially sectional view of the repaired floor pan when viewed from the car longitudinal direction.

FIG. 7 is a partially sectional view of the repaired floor pan 15 when viewed from the car longitudinal direction. As shown in FIG. 7, the flat portion 15a2 is formed on the bottom wall portion 15a of the floor pan 15. Therefore, for example, even if a hole H is formed on the bottom wall portion 15a of the floor pan 15 by a flying stone, or the bottom wall portion 15a deforms, the floor pan 15 can be quickly repaired in such a manner that: a flat reinforcing plate 20 is stacked on lower portions 15a7 and 15a8 of the flat portion 15a2, located at both car width direction sides of one mountain portion 15a1, so as to cover a damaged region of the bottom wall portion 15a; and the flat reinforcing plate 20 is attached to and fixed to the lower portions 15a7 and 15a8 by spot welding, plug welding, rivets, or the like. Further, since a hollow structure is formed by attaching the mountain portion 15a1 and the reinforcing plate 20 to each other, the floor pan 15 can be reinforced.

Figure 8:
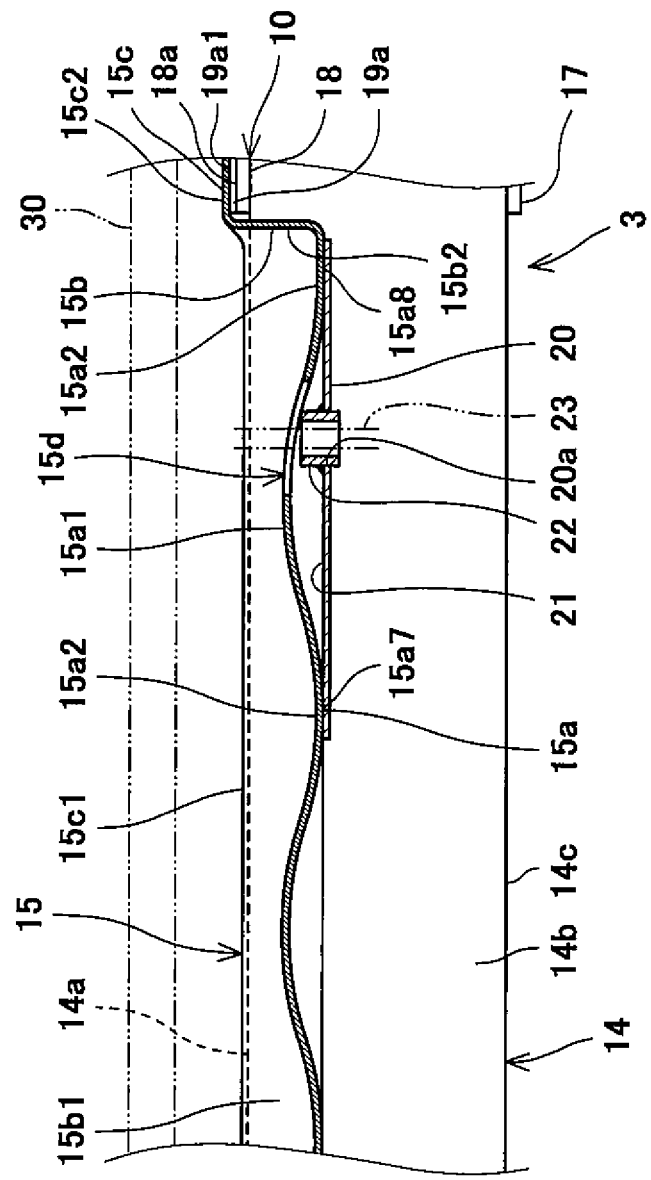
FIG. 8 is a partially sectional view of the floor pan on which an opening is formed, when viewed from the car longitudinal direction.

FIG. 8 is a partially sectional view of the floor pan 15 on which an opening 15d is formed, when viewed from the car longitudinal direction. By attaching and fixing the flat reinforcing plate 20 to the lower portions 15a7 and 15a8, a large flat portion 21 is formed under the mountain portion 15a1. Therefore, for example, the flat portion 21 can be utilized such that: an opening 20a is formed on the reinforcing plate 20 so as to be located under the mountain portion 15a1 of the floor pan 15; a through pipe 22 having a tube axis extending in the vertical direction is inserted into the opening 20a; and the through pipe 22 is fixed to an upper surface of the reinforcing plate 20 at a peripheral edge of the opening 20a by welding or the like. Then, a cable 23 can be inserted from the through pipe 22 through the opening 15d, formed on the mountain portion 15a1 to have a necessary minimum size, to reach a position above the floor pan 15. With this, while forming the necessary opening 20a on the reinforcing plate 20, the peripheral edge of the opening 20a can be reinforced by the through pipe 22. Thus, the degree of freedom of the design of the railcar 1 can be increased. Further, since the hollow structure is formed by attaching the mountain portion 15a1 and the reinforcing plate 20 to each other, the cable 23 can be protected from a flying stone and the like.

The present invention is not limited to the above embodiment, and modifications, additions, and eliminations of the components thereof may be made within the scope of the present invention. In the above embodiment, the floor pan 15 is the strength member configured to bear the compressive load and shearing load applied from the underframe 3. However, the floor pan 15 may be a strength member configured to bear at least one of the compressive load and shearing load applied from the underframe 3.

In the above embodiment, the swelling portions (mountain portions 15a1) formed on the bottom wall portion 15a of the floor pan 15 swell upward in the vertical direction. However, the swelling portions may swell downward in the vertical direction. Further, swelling portions (mountain portions 15a1) swelling upward in the vertical direction and swelling portions (valley portions) swelling downward in the vertical direction may be formed on the bottom wall portion 15a of the floor pan 15.

Each of the contour shape of the mountain portion 15a1 when viewed from the car longitudinal direction, the contour shape of the curved portion 15a6 of the mountain portion 15a1 when viewed from the car width direction, and the contour shape of the end portion 15a4 when viewed from the vertical direction is not limited to a shape constituted by a single curvature and may be a shape constituted by a plurality of curvatures.

The heat insulating materials do not necessarily have to be provided between the floor pan 15 and the floor panel 30 and around the supporting member 19. Air layers may be provided between the floor pan 15 and the floor panel 30 and around the supporting member 19.

A method of welding the floor pan 15 to the side sills 10 and the cross beams 14 is not limited to the spot welding and may be other welding such as laser welding. The long side portions 15c1 of the floor pans 15 located adjacent to each other in the car longitudinal direction may partially overlap each other.

REFERENCE SIGNS LIST 1 railcar
2 bogie
3 underframe
10 side sill 13 bolster beam
14 cross beam
14a1 upper surface of cross beam (upper surface of upper plate portion)
15 floor pan
15a bottom wall portion
15a1 mountain portion (swelling portion)
15a2 flat portion
15a4 end portion
15a5 linear portion
15a6 curved portion
15b side wall portion
15c flange portion
18a upper surface of third plate member (upper surface of side sill)

The invention claimed is:

1. A railcar comprising:
an underframe including
a pair of side sills; and
a plurality of cross beams each connected to the pair of side sills, the cross beams being arranged at intervals in a car longitudinal direction; and
a floor pan arranged in a space surrounded by the pair of side sills and a pair of adjacent cross beams among the plurality of cross beams, the floor pan being fixed to the underframe,
the floor pan having at least one swelling portion configured to bear at least one of a compressive load and shearing load applied from the underframe by preventing deformation of the floor pan.

2. The railcar according to claim 1, wherein a bottom wall portion of the floor pan includes:
the at least one swelling portion swelling in a vertical direction; and
a flat portion surrounding the at least one swelling portion.

3. The railcar according to claim 2, wherein when viewed from the car longitudinal direction, a contour shape of the at least one swelling portion is a curved shape.

4. The railcar according to claim 2, wherein when viewed from a car width direction, a contour shape of the at least one swelling portion is a shape constituted by: a linear portion spaced apart from the flat portion and extending in the car longitudinal direction; and a pair of curved portions each curvedly connected to a corresponding one of both car longitudinal direction end portions of the linear portion and the flat portion.

5. The railcar according to claim 2, wherein when viewed from the vertical direction, each of contour shapes of both car longitudinal direction end portions of the at least one swelling portion is a curved shape.

6. The railcar according to claim 2, wherein when viewed from the vertical direction, an apparent total area of the at least one swelling portion is larger than an apparent total area of the flat portion.

7. The railcar according to claim 2, wherein the at least one swelling portion comprises a plurality of swelling portions arranged on the bottom wall portion of the floor pan and lined up in a car width direction.

8. The railcar according to claim 7, wherein the at least one swelling portion comprises a plurality of swelling portions extending in the car longitudinal direction on the bottom wall portion of the floor pan.

9. The railcar according to claim 1, wherein:
the floor pan includes
side wall portions extending upward from a peripheral edge of a bottom wall portion of the floor pan and
a flange portion connected to upper ends of the side wall portions and fixed to the underframe; and
the bottom wall portion of the floor pan is located lower than upper surfaces of the cross beams and upper surfaces of the side sills.

10. The railcar according to claim 1, wherein:
the underframe further includes a pair of bolster beams supported by a pair of bogies;
the plurality of cross beams are arranged between the pair of bolster beams;
the space is one of a plurality of spaces provided at the underframe and lined up in the car longitudinal direction, each of the spaces being surrounded by the pair of side sills and a pair of cross beams among the plurality of cross beams; and
among the plurality of spaces, the floor pan is arranged in a space spaced apart from each of the bolster beams inward in the car longitudinal direction by one or more spaces.

11. The railcar according to claim 1, further comprising:
a bolster beam; and
at least one other floor pan,
wherein the floor pan is positioned closer to the bolster beam than any of the at least one other floor pan, and is directly fixed to one of the cross beams of the pair of adjacent cross beams that is closer to the bolster beam than any other of the plurality of cross beams.

12. A railcar comprising:
an underframe including
a pair of side sills; and
a plurality of cross beams each connected to the pair of side sills, the cross beams being arranged at intervals in a car longitudinal direction; and
a floor pan arranged in a space surrounded by the pair of side sills and a pair of adjacent cross beams among the plurality of cross beams, the floor pan being fixed to the underframe,
the floor pan being configured as a strength member configured to bear at least one of a compressive load and shearing load applied from the underframe, and
wherein a bottom wall portion of the floor pan includes:
at least one swelling portion swelling in a vertical direction; and
a flat portion surrounding the at least one swelling portion.

* * * * *